(12) United States Patent
Gong et al.

(10) Patent No.: US 9,495,119 B1
(45) Date of Patent: Nov. 15, 2016

(54) STATIC LOAD BALANCING FOR FILE SYSTEMS IN A MULTIPATH I/O ENVIRONMENT

(75) Inventors: Chen Gong, Beijing (CN); Huamin Chen, Natick, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 1807 days.

(21) Appl. No.: 12/832,658

(22) Filed: Jul. 8, 2010

(51) Int. Cl.
  *G06F 3/00* (2006.01)
  *G06F 3/06* (2006.01)

(52) U.S. Cl.
  CPC .................................. *G06F 3/0689* (2013.01)

(58) Field of Classification Search
  None
  See application file for complete search history.

(56) References Cited

U.S. PATENT DOCUMENTS

| | | | |
|---|---|---|---|
| 5,774,668 A | 6/1998 | Choquier et al. | |
| 5,893,140 A | 4/1999 | Vahalia et al. | |
| 6,343,324 B1 * | 1/2002 | Hubis et al. | 709/229 |
| 6,745,286 B2 | 6/2004 | Priester et al. | |
| 6,904,470 B1 | 6/2005 | Ofer et al. | |
| 7,024,427 B2 | 4/2006 | Bobbitt et al. | |
| 7,032,037 B2 | 4/2006 | Garnett et al. | |
| 7,275,103 B1 * | 9/2007 | Thrasher et al. | 709/224 |
| 7,299,294 B1 | 11/2007 | Bruck et al. | |
| 7,421,509 B2 | 9/2008 | Lolayekar et al. | |
| 7,539,824 B2 | 5/2009 | Lolayekar et al. | |
| 7,613,827 B2 | 11/2009 | Bruck et al. | |
| 7,739,379 B1 | 6/2010 | Vahalia et al. | |
| 7,962,914 B2 | 6/2011 | Caccavale | |
| 7,987,268 B2 | 7/2011 | Chen et al. | |
| 2003/0105903 A1 | 6/2003 | Garnett et al. | |
| 2004/0078467 A1 | 4/2004 | Grosner et al. | |
| 2004/0210623 A1 | 10/2004 | Hydrie et al. | |

OTHER PUBLICATIONS

Uresh Vahalia, Unix Internals: The New Frontiers, Chapter 9, "File System Implementations," 1996, p. 261-289, Prentice-Hall, Inc., Upper Saddle River, NJ.
EMC CLARiiON Best Practices for Fibre Channel Storage, Engineering Whitepaper, Mar. 16, 2004, 36 pages, EMC Corporation, Hopkinton, MA.
PowerPath Version 4.6 Product Guide P/N 300-003-927 REV A03, Jun. 2007, 228 pages, EMC Corporation, Hopkinton, MA.
EMC PowerPath with Symmetrix and CLARiiON Storage Systems, Technology Concepts and Business Considerations, White Paper, Jun. 2006, 14 pages, EMC Corporation, Hopkinton, MA.
EMC CLARiiON High Availablity (HA) Best Practices Planning, White Paper, Apr. 2007, 19 pages, EMC Corporation, Hopkinton, MA.

(Continued)

*Primary Examiner* — Henry Tsai
*Assistant Examiner* — Juanito Borromeo
(74) *Attorney, Agent, or Firm* — Polsinelli PC

(57) ABSTRACT

A data processing system includes a file server and a storage controller linking the file server to a storage array. There are alternative data paths between the file server and the storage controller for accessing logical units of storage (LUNs) in the storage array. A file system is striped across the LUNs. For load balancing, the file server is programmed with a facility for selecting mappings between the LUNs and the data paths. Upon mounting the file system, the facility is invoked to get a next mapping between the LUNs and the data paths, and this next mapping is used during read and write access to the mounted file system. The facility can also be invoked to get another mapping when another file system is mounted on the LUNs.

23 Claims, 10 Drawing Sheets

(56) References Cited

OTHER PUBLICATIONS

Deploying Oracle VM 2.2 on EMC CLARiiON CX4 Series Storage, Applied Technology, White Paper, Feb. 2010, 20 pages, EMC Corporation, Hopkinton, MA.

EMC CLARiiON Database Storage Solutions: Microsoft SQL Server 2000 and 2005, Best Practices Planning, White Paper, Aug. 2007, 24 pages, EMC Corporation, Hopkinton, MA.

EMC CLARiiON CX3 Best Practices for Achieving "Five 9s" Availability, Best Practices Planning, Feb. 2007, 14 pages, EMC Corporation, Hopkinton, MA.

EMC CLARiiON MetaLUNNs, A Detailed Review, White Paper, Mar. 2010, 56 pages, EMC Corporation, Hopkinton, MA.

EMC Celerra Multi-Path File System (MPFS), Data Sheet, Nov. 2009, 4 pages, EMC Corporation, Hopkinton, MA.

EMC Celerra Manager Makes Customizing Storage Pool Layouts Easy, White Paper, Jun. 2010, 17 pages, EMC Corporation, Hopkinton, MA.

Red Hat Enterprise Linux 4 DM Multipath, 2009, 40 pages, Red Hat, Inc., Raleigh, NC.

Highly Available Storage: Multipathing and the Microsoft MPIO Driver Architecture, White Paper, Oct. 2003, 16 pages. Microsoft Corporation, Redmond, WA.

Kochavara, Sheetal, Using EMC CLARiiON Storage with VMware vSphere and VMware Infrastructure, Book, 2010, 356 pages, EMC Corporation, Hopkinton, MA.

Hallbauer, Joerg, Path Management Software Recommendations, Apr. 17, 2010, 4 pages gestaltit.com, Internet.

Diwakarnitw, What are the differences between failover modes on a CLARiiON array?, Jul. 22, 2007, 3 pages, ussadmin.com, Internet.

Guy, San, LUNs, Clario blogs, Jan. 30, 2008, 3 pages, blogspot.com, Internet.

* cited by examiner

MAPPING FOR PATHS SET AT CONFIGURATION TIME FOR EACH LUN

| LUN | PATH |
|---|---|
| LUN 0 | F0→S0 |
| LUN 1 | F1→S1 |
| LUN 2 | F2→S2 |
| LUN 3 | F3→S3 |

*—111*

LUN MAPPING FOR PATHS SET AT FILE SYSTEM MOUNT TIME FOR EACH FILE SYSTEM

CURRENT INDEX (I) —112

NO. OF PATHS, N=4 —114

| PATH | STATUS | USAGE COUNT |
|---|---|---|
| F0→S0 | 1 | 2 |
| F1→S1 | 1 | 2 |
| F2→S2 | 1 | 2 |
| F3→S3 | 1 | 2 |

*—115*

| FILE SYSTEM | LUN-TO-PATH MAPPING |
|---|---|
| FS_0 | LUN0:F0-S0; LUN1:F1-S1; LUN2:F2-S2; LUN3:F3-S3 |
| FS_1 | LUN0:F1-S1; LUN1:F2-S2; LUN2:F3-S3; LUN3:F0-S0 |

*—116*

LUN ACCESS PATH DATABASE FOR ONE META-LUN

FIG. 8

| RAID GROUP | LUN | SPA | SPB | FS-3 | FS-4 |
|---|---|---|---|---|---|
| 1 | 1 | √ |  | √ |  |
|  | 2 |  | √ |  | √ |
| 2 | 3 | √ |  |  | √ |
|  | 4 |  | √ | √ |  |
| 3 | 5 | √ |  | √ |  |
|  | 6 |  | √ |  | √ |
| 4 | 7 | √ |  |  | √ |
|  | 8 |  | √ | √ |  |

| LUN | PATH |
|---|---|
| LUN 1 | F0→S0 |
| LUN 2 | F2→S2 |
| LUN 3 | F0→S0 |
| LUN 4 | F2→S2 |
| LUN 5 | F0→S0 |
| LUN 6 | F2→S2 |
| LUN 7 | F0→S0 |
| LUN 8 | F2→S2 |

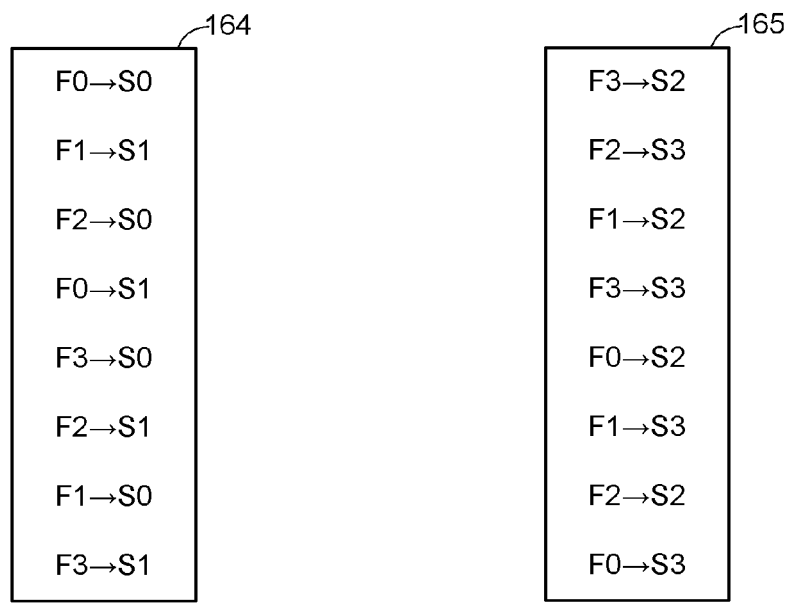

STATIC LOAD BALANCING FOR FILE SYSTEMS IN A MULTIPATH I/O ENVIRONMENT

FIELD OF THE INVENTION

The present invention relates to the management of paths between a file server and a storage controller of a data storage system.

BACKGROUND OF THE INVENTION

Data storage is most economically provided by a storage system including a storage controller and a redundant array of data storage devices such as a redundant array of inexpensive disks (RAID). For servicing a large number of network clients, a file server is interposed between the network clients and the storage system for authenticating the network client requests and for mapping the network client requests to storage addresses in the storage system.

To improve read/write access performance and enhance reliability, multiple data paths are provided between the file server and the storage array, and path management techniques are used to distribute storage access requests from the file server over the multiple data paths between the file server and the storage array. Traditionally, a system administrator has pre-planned the configuration of the storage array into logical units of storage (LUNs), the concatenation of the LUNs into meta-LUNs, and the creation of the file systems upon the meta-LUNs so that network client access to one or more file systems will spread the I/O over the available data paths between the file server and the storage array controller. Sometimes a significant load imbalance would occur in this environment. When a significant load imbalance would occur, the system administrator would change the assignment of the LUNs to the storage controller paths, or migrate files in the file system to a new file system built upon a meta-LUN having a different configuration.

More recently, file servers have been provided with an automatic and dynamic load balancing facility for distributing network client I/O requests across all available paths from the server to the storage devices that may service the I/O requests. For example, EMC Corporation has sold a PowerPath® load balancing facility in the form of a software layer between the file system manager layer and the SCSI device driver layer in the file server. The PowerPath® load balancing facility directs each I/O request to a selected port of the storage system based on a pre-selected one of four load balancing policies. The system administrator can chose an adaptive policy (the default policy), a round-robin policy, a least I/Os policy, or a least-blocks policy. The adaptive policy is to select the path on the basis of path load (queue with the shortest depth in time) and device priority. The round-robin policy selects the next available path in rotation. The least I/Os policy selects the path with the fewest pending I/O requests. The least blocks policy selects the path with the fewest pending blocks of I/O data.

In a storage system having two separate service processors, such as the EMC Corporation CLARiiON® storage system, for bandwidth, it was recommended that the disk groups used should be dedicated (no other LUNs contending for access) and the LUNs making up a meta-LUN or host volume could be in the separate service processors in order to distribute load across storage-system resources and to maximize port bandwidth. In this case the host would use two host bus adapters (HBAs), each of which is zoned to a single port on each service processor. It was further recommended that if available on the host operating system, the EMC Corporation PowerPath® load balancing facility should always be used, whether for a single-attach system through a switch or in a fully redundant system. See EMC CLARiiON Best Practices for Fibre Channel Storage, Engineering White Paper, pages 11-14, Mar. 16, 2004, EMC Corporation, Hopkinton, Mass.

SUMMARY OF THE INVENTION

The present invention provides methods of static load balancing that are less complex and provide the same or better performance than the conventional methods of dynamic load balancing in certain multipath I/O environments.

In accordance one aspect, the invention provides a computer-implemented method of load balancing over data paths between a file server and a storage controller of a storage system. The storage system includes a storage array storing logical units of storage. The storage controller provides the file server with access to the logical units of the storage in the storage array. A file system is striped across a sequence of a certain number of the logical units of the storage so that sequential read or write access to a file in the file system sequentially accesses the certain number of logical units of storage for concurrent transfer of read or write data between the file server and the storage controller over more that one of the data paths between the file server and the storage controller. The method includes a data processor of the file server executing computer instructions stored on a non-transitory computer-readable storage medium to perform the steps of programming the data processor with a facility for providing mappings between the certain number of logical units of the storage and the data paths between the file server and the storage controller for read or write access to the certain number of logical units of the storage. Upon mounting the file system to enable read-write access to the file system, the method further includes invoking the facility to obtain a next mapping between the certain number of logical units of the storage and the data paths between the file server and the storage controller for read or write access to the certain number of logical units of the storage. Then, upon read or write access of the file server to the data storage of a file in the mounted file system, the method further includes using the next one of the mappings between the certain number of logical units of the storage and the data paths between the file server and the storage controller to select and use one of the data paths for conveying data read from or written to the file in the mounted file system.

In accordance with another aspect, the invention provides a data storage system including a file server, a storage controller; and a storage array storing logical units of storage. The storage controller links the file server to the storage array for providing the file server with access to the logical units of the storage in the storage array. A file system is striped across a sequence of a certain number of the logical units of the storage so that sequential read or write access to a file in the file system sequentially accesses the certain number of logical units of storage for concurrent transfer of read or write data between the file server and the storage controller over more that one of the data paths between the file server and the storage controller. The file server further including a data processor, and a non-transitory computer-readable storage medium. The non-transitory computer-readable storage medium stores computer instructions that when executed perform load balancing by the steps of programming the data processor with a facility for providing mappings between the certain number of logical units of the storage and the data paths between the file server and the storage controller for read or write access to the certain number of logical units of the storage, and upon mounting the file system to enable read-write access to the file system, invoking the facility to obtain a next mapping between the certain number of logical units of the storage and the data paths between the file server and the storage controller for read or write access to the certain number of logical units of the storage, and then upon read or write access of the file server to the data storage of a file in the mounted file system, using the next one of the mappings between the certain number of logical units of the storage and the data paths between the file server and the storage controller to select and use one of the data paths for conveying data read from or written to the file in the mounted file system.

In accordance with a final aspect, the invention provides a non-transitory computer-readable storage medium storing computer instructions for load balancing over data paths between a file server and a storage controller providing the file server with access to logical units of the storage in the storage array. A file system is striped across a sequence of a certain number of the logical units of the storage so that sequential read or write access to a file in the file system sequentially accesses the certain number of logical units of storage for concurrent transfer of read or write data between the file server and the storage controller over more that one of the data paths between the file server and the storage controller. The computer instructions when executed by a data processor of the file server perform the steps of programming the data processor with a facility for selecting mappings between the certain number of logical units of the storage and the data paths between the file server and the storage controller for read or write access to the certain number of logical units of the storage, and upon mounting the file system to enable read-write access to the file system, invoking the facility to obtain a next mapping between the certain number of logical units of the storage and the data paths between the file server and the storage controller for read or write access to the certain number of logical units of the storage, and then upon read or write access of the file server to the data storage of a file in the mounted file system, using the next one of the mappings between the certain number of logical units of the storage and the data paths between the file server and the storage controller to select and use one of the data paths for conveying data read from or written to the file in the mounted file system.

BRIEF DESCRIPTION OF THE DRAWINGS

Additional features and advantages of the invention will be described below with reference to the drawings, in which:

FIG. 8 is a block diagram of the LUN access path database introduced in FIG. 7;

FIG. 11 is a table showing an assignment of each of the LUNs in FIG. 10 to either one or the other of the service processor in the storage controller of FIG. 10;

FIG. 12 is a first mapping table that may be used for setting access paths at configuration time for each LUN in the storage array of FIG. 10;

FIG. 13 is a second mapping table that may be used for setting access paths at configuration time for each LUN in the storage array of FIG. 10; and FIG. 14 is a list of active paths available for accessing odd numbered LUNs in the data processing system of FIG. 10; and FIG. 15 is a list of active paths available for accessing even numbered LUNs in the data processing system of FIG. 10.

Figure 1:
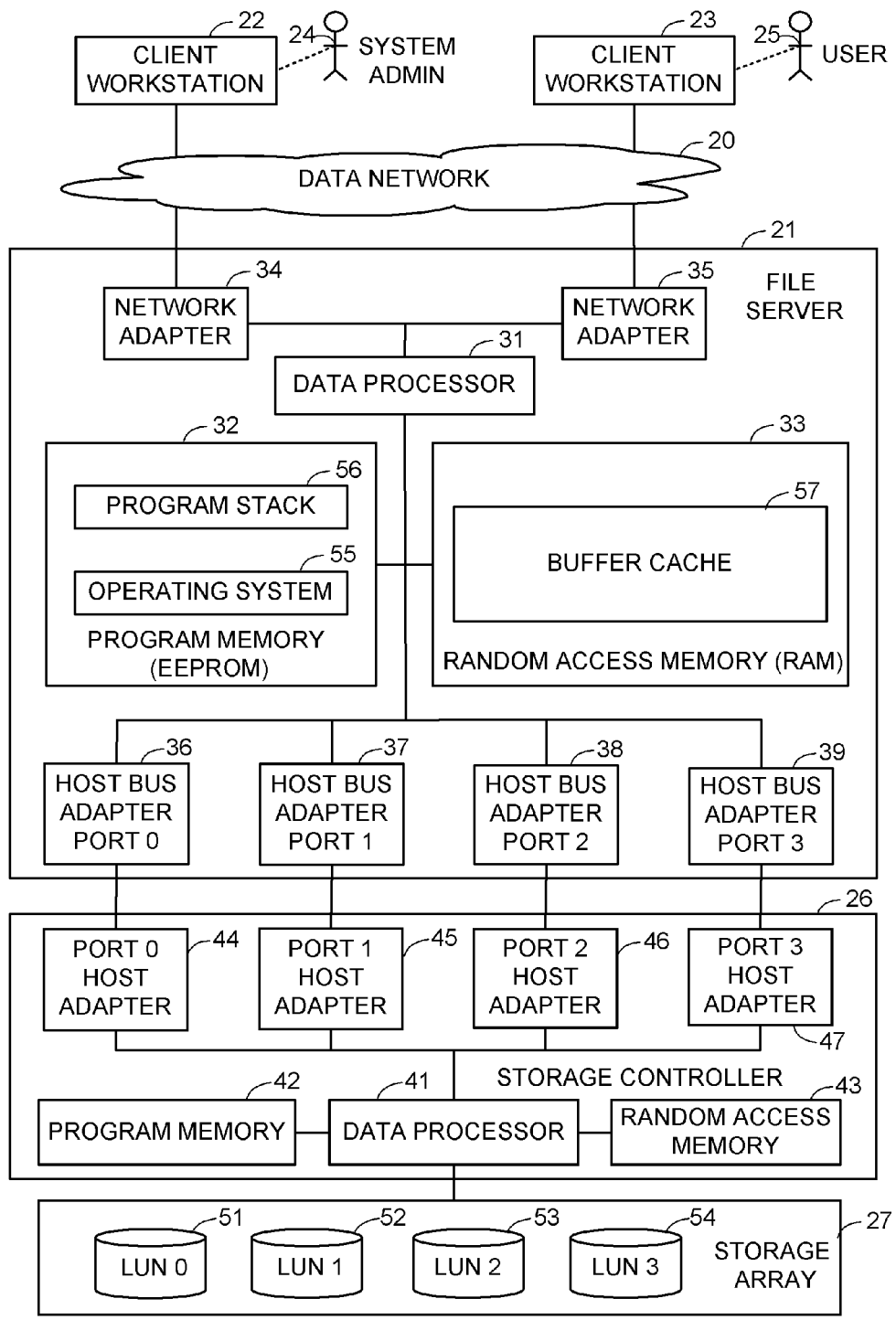
FIG. 1 is a block diagram of a data processing system including a file server, a storage controller, and a storage array.

While the invention is susceptible to various modifications and alternative forms, specific embodiments thereof have been shown in the drawings and will be described in detail. It should be understood, however, that it is not intended to limit the invention to the particular forms shown, but on the contrary, the intention is to cover all modifications, equivalents, and alternatives falling within the scope of the invention as defined by the appended claims.

DETAILED DESCRIPTION OF THE PREFERRED EMBODIMENT

With reference to FIG. 1, there is shown a data network 20 including a file server 21 servicing network client workstations 22, 23 operated by human users 24, 25. The file server includes network adapters 34, 35 linking the file server 21 to the data network 20, and a data processor 31 coupled to the network adapters 34, 35 and programmed for responding to network client requests for access to files stored in a data storage array 27. The data processor 31 is a general purpose digital computer data processor including one or more core central processing units (CPUs) for executing computer program instructions stored in a program memory 32.

The program memory 32 is a non-transitory computer readable storage medium, such as electrically erasable and programmable read-only memory (EEPROM). In general, non-transitory computer readable storage medium is a physical device or physical material which serves to store computer-readable data on a permanent or semi-permanent basis. Examples of other kinds of non-transitory computer readable storage medium include magnetic disks, magnetic tape, and optical disks. The program memory 32 stores an operating system program 55 and various other programs 56 executed under control of the operating system program, as described further below with reference to FIG. 2.

As further shown in FIG. 1, the file server 21 includes random access memory 33. A majority of the random access memory 33 is used as a buffer cache 57 for buffering data read from or written to the storage array 27 in response to file access requests from the network clients 22, 23. Moreover, in the data processing system of FIG. 1, the file server 21 is not directly attached to the storage array 27. Instead, a storage controller 26 is interposed between the file server 21 and the storage array 27 so that the file server 21 may access logical units of storage (LUNs) 51, 52, 53, and 54 in the storage array 27.

The storage controller 26 includes a data processor 41, a program memory 42, and random access memory 43. The program memory 42 is programmed so that the data processor 41 translates logical address of the logical units of storage into physical addresses of one or more storage devices in the storage array 27. The data processor 41 may also cache data in the random access memory 43, and perform automatic error detection, correction, and recovery from single storage device errors using redundant data storage techniques such as redundant arrays of inexpensive disks (RAID).

The present invention more particularly concerns load balancing over alternative data paths from the file server 21 to a storage array controller 26. In the data processing system of FIG. 1, there are four alternative data paths between the file server 21 and the storage controller 26. The first data path includes a first host bus adapter 36 in the file server 21 and a first host adapter 44 in the storage controller 26. This first data path will be referred to as "F0→S0" as a short-hand notation for "file server host adapter port 0 to storage controller host adapter port 0." The second data path includes a second host bus adapter 37 in the file server 21 and a second host adapter 45 in the storage controller 26. This second data path will be referred to as "F1→S1." The third data path includes a third host bus adapter 38 in the file server 21 and a third host adapter 46 in the storage controller 26. This third data path will be referred to as "F2→S2." The fourth data path includes a fourth host bus adapter 39 in the file server 21 and a fourth host adapter 47 in the storage controller 26. This fourth data path will be referred to as "F3→S3."

In the data processing system of FIG. 1, the data processor 31 in the file server 21 is coupled to each of the host bus adapters 36, 37, 38, and 39 in order to use any one of these four paths for transmitting read or write requests for access to any one of the LUNs 51, 52, 53, and 54 in the storage array 27. The data processor 41 in the storage controller 26 is coupled to each of the host adapters 44, 45, 46, 47 for receiving the read or write requests from the data processor 31 of the file server 21. Upon receiving a read or write request from a particular one of these four paths, the data processor 41 of the storage controller 26 returns a response along the same path back to the data processor 31 of the file server 21.

Figure 2:
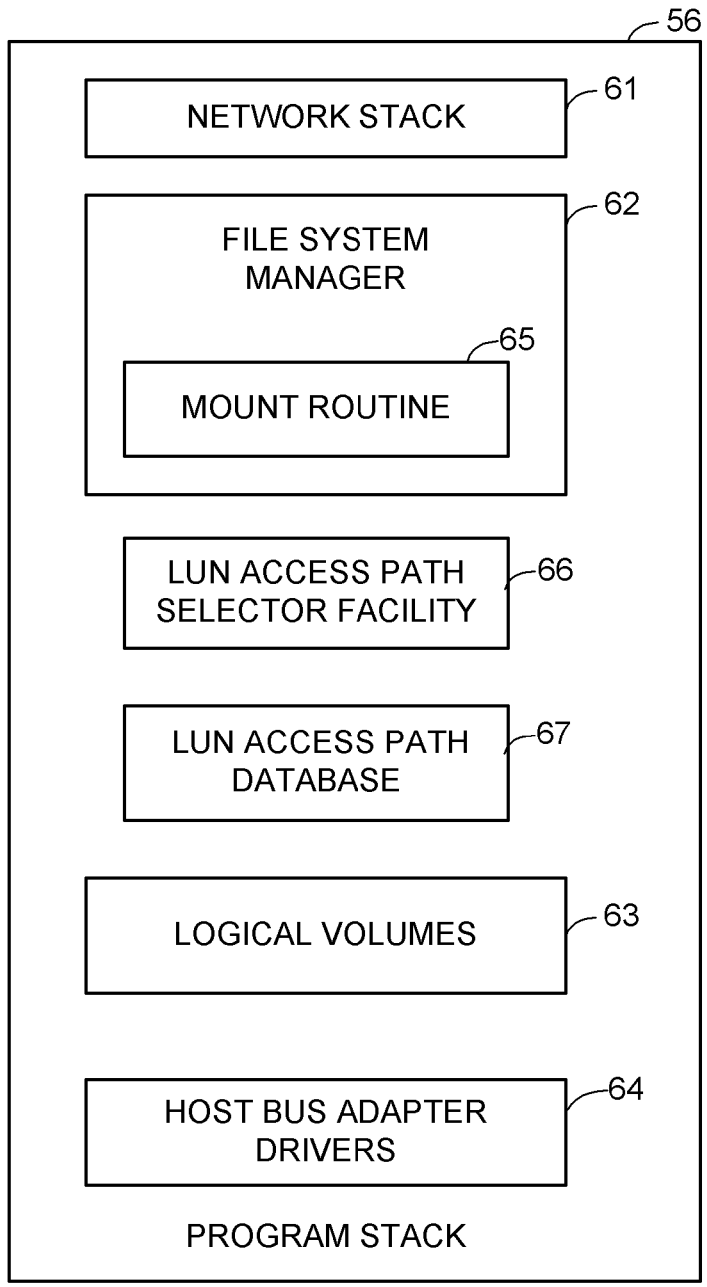
FIG. 2 is a block diagram of a file server program stack introduced in FIG. 1.

FIG. 2 shows a stack of programs 56 introduced in FIG. 1. FIG. 2 shows a network stack 61 used by the data processor (31 in FIG. 1) of the file server (21 in FIG. 1) for communicating with the network clients 22, 23. The network stack includes programs for data transport over the data network 20, such as programs for the Internet Protocol (IP) and the Transmission Control Protocol (TCP), and programs for network file access protocols, such as the Network File System (NFS) protocol and the Common Internet File System (CIFS) protocol. For example, network clients such as UNIX (Trademark) workstations may use the Network File System (NFS) protocol to access files in the data storage 31, and network clients such as Microsoft Windows (Trademark) workstations may use the Common Internet File System (CIFS) protocol to access files in the primary data storage 31.

The program stack 56 also includes a file system manager 62. The file system manager 62 manages hierarchical file systems in the data storage of the storage array (27 in FIG. 1). A suitable kind of file system is the UNIX file system, as described in Chapter 9, pp. 261-289 of Uresh Vahalia, Unix Internals: The New Frontiers, 1996, Prentice Hall, Inc., Simon & Schuster, Upper Valley River, N.J. 07458. The file system manager 44 is further described in Vahalia et al. U.S. Pat. No. 5,893,140 issued Apr. 6, 1999, entitled "File Server Having a File System Cache and Protocol for Truly Safe Asynchronous Writes," incorporated herein by reference.

The file system manager 62 is layered over a logical volumes module 63, so that each file system maintained by the file system manager 62 is built upon a logical volume managed by the logical volumes module 63. The logical volumes module 63 maps the logical extent of each logical volume into logical addresses of storage in one or more logical units of storage (LUNs) in the storage array (27 in FIG. 1). The logical volumes module 63 accesses a specified LUN by invoking one of the host bus adapter drivers 64 for a specified one of the host bus adapters (36, 37, 38, and 39 in FIG. 1). For access to a specified LUN in a specified logical volume, the logical volumes module access a LUN access path database 67 to get a path descriptor specifying the path that the logical volumes module 63 should use for sending a read or write request to the storage controller (26 in FIG. 1).

In accordance with an aspect of the present invention, the LUN access paths used for providing a network client with read or write access to a file system are not dynamic over the duration of time that a file system is mounted. Instead, these LUN access paths are selected once the file system has been mounted and network client access to the file system has been enabled.

In a preferred implementation, a load balancing technique for a file system is selected by a systems administrator (24 in FIG. 1) when a file system is built on a logical volume, and this load balancing technique is specified as an attribute of the volume upon which the file system is built. One of the load balancing techniques is a technique that selects, when a file system is mounted, the paths that will be used to access the LUNs for access of network clients to the mounted file system. For this purpose, if this load balancing technique has been specified, then the mount routine 65 invokes a LUN access path selector facility 66 to select the paths that will be used to access the LUNs for access of the network clients to the mounted file system, and to put the selected paths into the LUN access path database 67. Another one of the load balancing techniques assigns specific paths to the LUNs prior to mount time, for example when the logical volume or file system is created, so that before the file system is mounted, each LUN already has a respective specified path for read or write access to the file system, and this path is used for access to the LUN by any network client for access to the file system.

Figure 3:
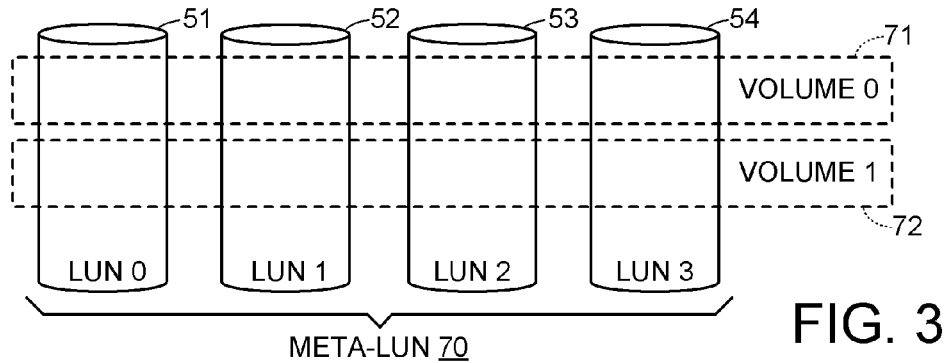
FIG. 3 is a block diagram of volumes striped across logical units of storage in the storage array of FIG. 1.

These load balancing techniques are most effective for file systems built on logical volumes that are striped across a series of LUNs. The series of LUNs are often called a "meta-LUN." FIG. 3, for example, shows that the LUNs 51, 52, 53, and 54 form a meta-LUN 70 across which are striped two volumes 71 and 72.

Figure 4:
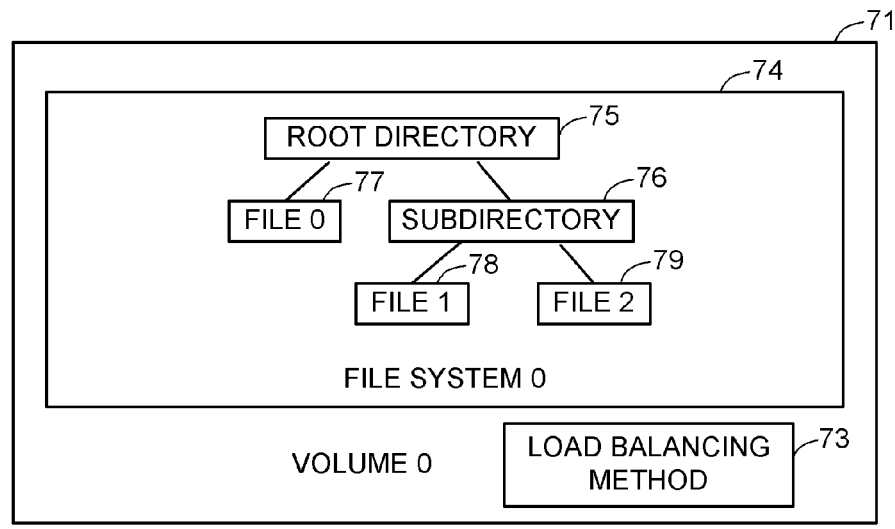
FIG. 4 is a block diagram of a file system built on one of the volumes of FIG. 3.

As shown in FIG. 4, a file system 74 is built upon the volume 71. The file system includes a root directory 75, a subdirectory 76, and regular data files 77, 78, and 79. When the file system 74 is built on the volume 71, the system administrator sets an attribute 73 of the volume specifying a load balancing method for the volume.

Figure 5:
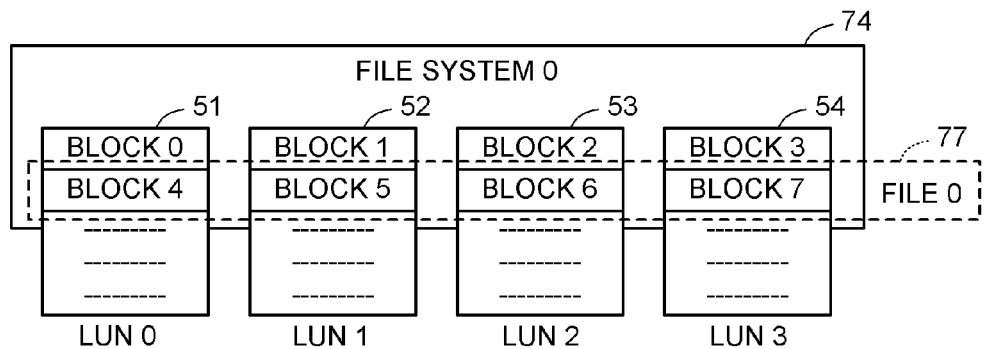
FIG. 5 is a block diagram of showing how data blocks of a file in the file system of FIG. 4 is striped across the logical units of storage in the storage array of FIG. 1.

As shown in FIG. 5, the file 77 has its data blocks (BLOCK 4, BLOCK 5, BLOCK 6, BLOCK 7) striped across the LUNs 51, 52, 53, 54, so that if each of the LUNs is accessed over a different one of the four paths between the file server (21 in FIG. 1) and the storage controller (26 in FIG. 1), then it is possible for the file server to access the four LUNs concurrently for high-speed transfer of read or write data when servicing a read or write request from a network client.

Figure 6:
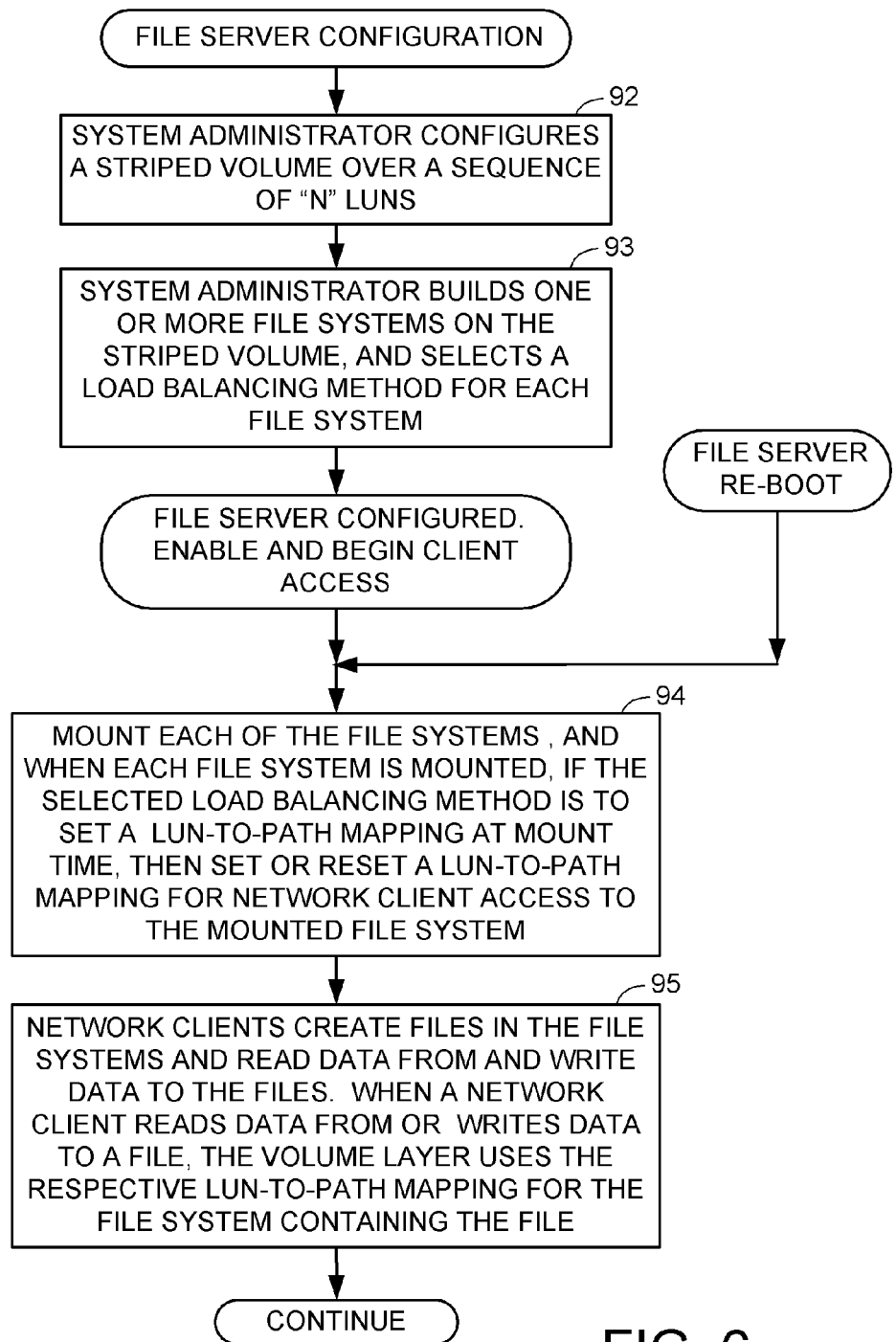
FIG. 6 is a flowchart of a method of configuration and load balancing in the file server of FIG. 1.

FIG. 6 shows a flowchart of the overall load-balancing method. Starting with file server configuration, in step 92, the system administrator configures a striped volume over a sequence of "N" LUNs. In step 93, the system administrator builds one or more file systems on the striped volume, and selects a load balancing method for each file system. In step 94, each of the file systems is mounted, and when each file system is mounted, if the selected load balancing method is to set a LUN-to-path mapping at mount time, then a LUN-to-path mapping is set for network client access to the file system. For example, a reset of the LUN-to-path mapping, possibly to a different mapping, would occur in response to a re-boot of the file server.

In step 95, the network clients create files in the file systems and read data from and write data to the files. When a network client reads data from or writes data to a file, the volume layer uses the respective LUN-to-path mapping for the file system containing the file.

Figure 7:
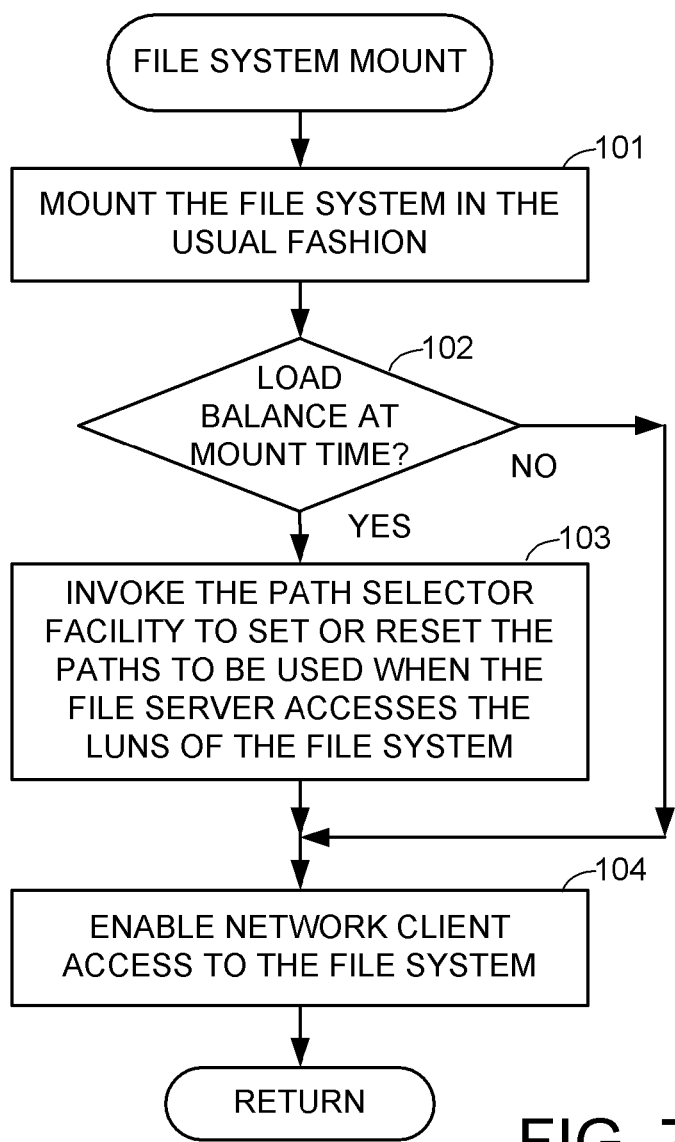
FIG. 7 is a flowchart of further details of load balancing during the mounting of a file system in the method of FIG. 6.

FIG. 7 shows a flow chart of the file system mount routine (65 in FIG. 2). In step 101 of FIG. 7, the file system is mounted in the usual fashion. In step 102, if the selected load balancing method for the file system is load balance at mount time, then execution continues to step 103. In step 103, the path selector facility is invoked to set or reset the paths to be used when the file server accesses the LUNs of the file system. Execution continues from step 103 to step 104. Execution also branches from step 102 to step 104 if the load balancing method is not load balance at mount time. In step 104, network client access to the file system is enabled, and execution returns.

FIG. 8 shows the LUN-to-path mapping database 67. The database 67 includes a mapping table 111 that is used by the logical volumes layer (63 in FIG. 2) if the selected load balancing method is to use a mapping set at configuration time. In this case, to service access to the LUNs for any file system built on the meta-LUN, the file server accesses LUN 0 over path F0→S0, LUN 1 over path F1→S1, LUN 2 over path F2→S2, and LUN 3 over path F3→S3.

The database 67 includes a number of data structures that are used by the LUN access path selector facility (66 in FIG. 2) if the selected load balancing method is to set the LUN paths at mount time for each file system. These data structures include a current index (I). The current index is used by the LUN access path selector facility (66 in FIG. 2) to begin a search for a good path to assign to the LUNs by continuing a scan thorough a path table 115. The path table has a size 114, indicating a number (N) of paths in the table. The path table 115 includes, for each path, a status indicating whether or not a path is active, and a usage count. The usage counts are all set to zero upon re-boot of the file server, and are used during path selection to ensure that the next path selected will always have a minimum value of all the usage counts in the path table.

The database 67 also includes a LUN-to-path mapping table 116 used by the logical volumes layer (63 in FIG. 2) when the selected load balancing method is to set the LUN mapping for paths at file system mount time for each file system.

Figure 9:
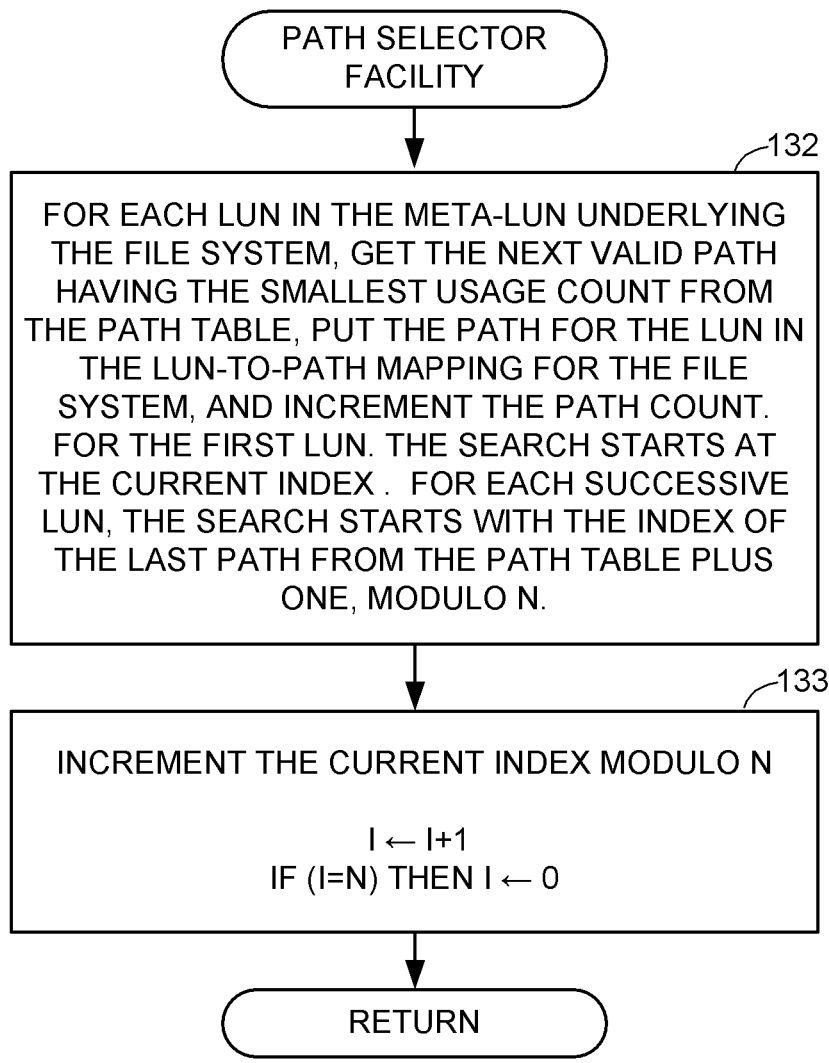
FIG. 9 is a flowchart of a path selector facility invoked in FIG. 7.

FIG. 9 shows a flowchart of the LUN access path selector facility (66 in FIG. 2). In a first step 132, for each LUN in the meta-LUN underlying the file system, the next valid path is obtained having the smallest usage count from the path table. The path for the LUN is put in the LUN-to-path mapping for the file system, and the path count for this path is incremented in the path table. For the first LUN in the meta-LUN underlying the file system, this search starts at the current index (I). For each successive LUN, the search starts with the index of the last path from the path table plus one, modulo N. This ensures that in the absence of a path becoming invalid, for example due to the path being "fenced off" upon detection of a path failure, it is likely that LUN access for a network client to a file system will not share a path. In step 133, the current index is incremented, modulo N.

For example, step 132 could be coded by the following pseudo-code:

```
K←0 //Set LUN index to zero
J←I //Set scan index to path table index
50 If (PATH_STATUS(J) is valid) then go to 100
   J←J+1
   If (J=N) then J←0
   If (J=I)) then return error //No valid paths
   Go to 50
100 CNT←COUNT(J) //Get count from path table
   Call Search for minimum usage count in the path table
      .//Returns CNTMIN and its index JM
   If (CNT is NOT=CNTMIN) then J←JM
   FS_PATH(K)←PATH(J) //Set the path for the file system
      to the Kth LUN
   COUNT(J)←COUNT(J)+1 //Increment the count in the
      path table
   If (K=KMAX) then (I←J) and RETURN //Normal exit
      point
   K←K+1
   J←J+1
   If (J=N) then J←0
   L←J
   If (PATH_STATUS(J) is valid) then go to 100
   J←J+1
   If (J=N) then J←0
   If (J=L) then return error //no valid paths
   Go to 100
```

Figure 10:
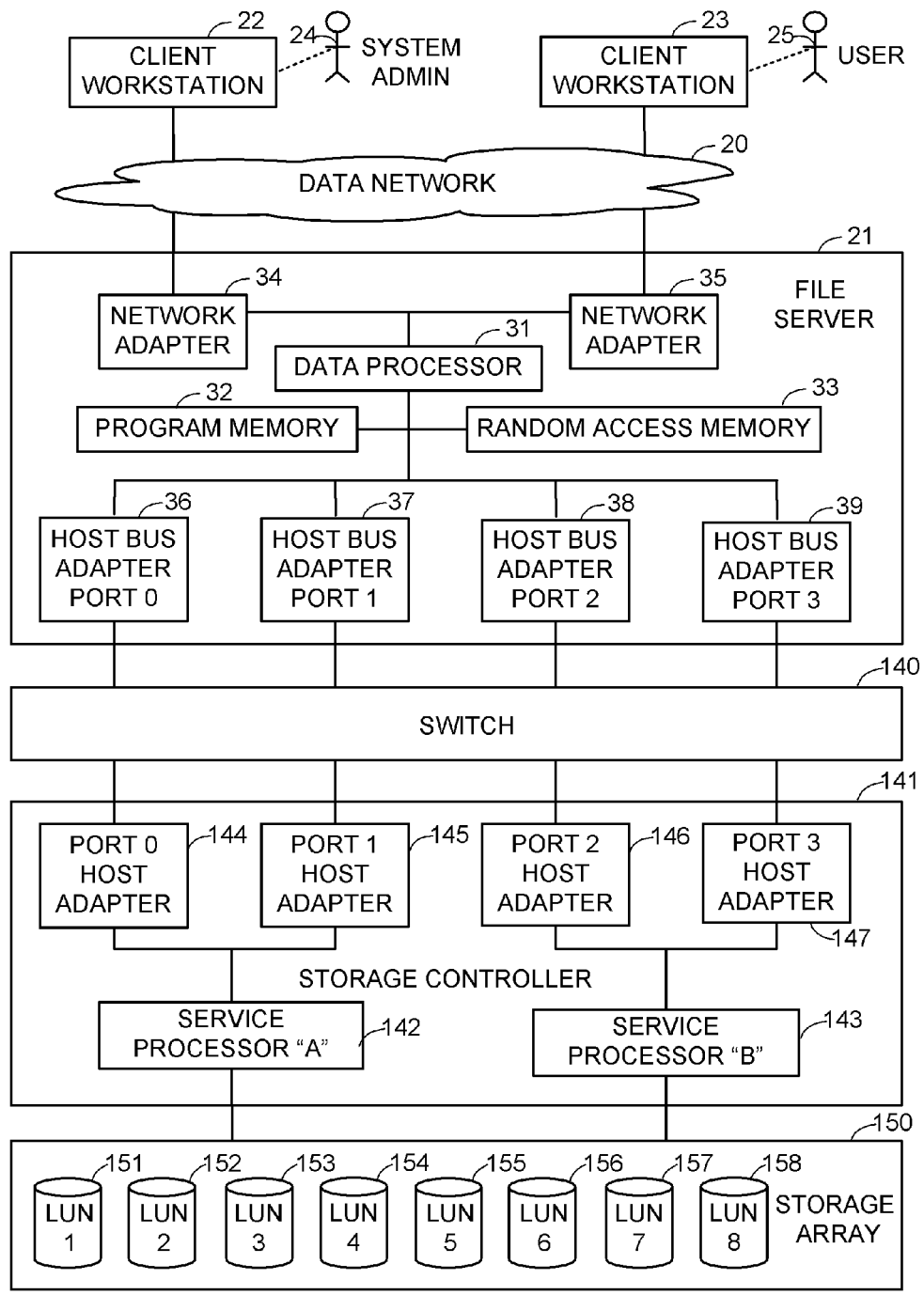
FIG. 10 is a block diagram of a data processing system having more complex paths for accessing LUNs in a storage array.

FIG. 10 shows a data processing system resulting when the storage controller 26 of FIG. 1 is replaced with a storage controller 141 having an asymmetric assignment of LUNs to the storage controller ports, and a switch 140 is inserted between the file server 21 and the storage controller 141. In this case the storage controller has two separate and independent service processors 142 and 143. A first service processor 141, having a short-hand designation of SPA, services two host adapter ports 144 and 145, having respective short-hand designations S0 and S1. A second service processor 143 services two host adapter ports 146 and 147, having respective short-hand designations S2 and S3. In this example, the service processors 142, 142 configure the storage array 150 to present eight LUNs 151, 152, 153, 154, 155, 156, 157, and 158 to the file server 21. Normally, in the absence of a service processor failure or failures of the host adapters or host bus adapters, each LUN is serviced by only a pre-assigned one of the service processors.

For example, as shown in the configuration table 161 of FIG. 11, the odd numbered LUNs are assigned to the first service processor (142 in FIG. 10) (SPA) and the even numbered LUNs are assigned to the second service processor (143 in FIG. 10) (SPB). Each odd numbered LUN is paired with a respective even numbered LUN and are configured from storage in the same RAID group. In other words, two and only two LUNs are bound in a RAID group, and one LUN is assigned to SPA and the other LUN is assigned to SPB.

Also, when creating a file system on the LUNs, one tries to use multiple LUNs and chose one and only one LUN from any one raid group. The LUNs that are chosen should be equally assigned to SPA and SPB. By applying these best practices to the LUNs in the table 161 of FIG. 11, one could stripe a file system FS-3 across a meta-LUN formed by concatenating LUNs 1, 4, 5, and 8, and one could stripe another file system FS-4 across a meta-LUN formed by concatenating LUNs 2, 3, 6, and 7. In a more general case, the LUNs' numbers that are chosen to create a file system has a pattern. The pattern is like: 1, 4, 5, 8, 9, 12 . . . . It could be generalized further as: X, X+3, X+1*4, (X+3)+1*4, X+2*4, (X+3)+2*4, If X is a odd number, all X, X+1*4, X+2*4, . . . . X+n*4 are odd number. All the LUNs with these numbers are assigned to the same SP. And all X+3, X+3+1*4, X+3+n*4 LUNs are assigned to the other SP.

For the configuration shown in FIG. 11, the method of load balancing when a file system is configured could use the LUN-to-path mapping table 162 shown in FIG. 12. In this case, all network client access to all odd number LUNs is from one path, and all network client access to all even number LUNs is from another path.

For the configuration shown in FIG. 11, the method of load balancing when a file system is configured could use the LUN-to-path mapping table 163 shown in FIG. 13. In this case, all network clients access LUN X from one path, and LUN X+4 from another path.

For the configuration shown in FIG. 11 and the switch configuration of FIG. 10, the method of load balancing when a file system is mounted presents a challenge that with respect to load balancing in the absence of path failure, the storage controller 141 acts as two separate storage controllers, one controlled by the first service processor SPA and the other controlled by the second service processor SPB. This challenge can be addressed by using one current index (112 in FIG. 8) for the first service processor SPA, and one path table (115 in FIG. 8) for the first service processor SPA, and another current index (112 in FIG. 8) and another path table (115 in FIG. 8) for the second service processor SPB. Thus, the path selection routine of FIG. 9 is performed twice, once with respect to SPA to get the paths to the LUNs serviced by SPA, and once with respect to SPB to get the paths to the LUNs serviced by SPB. For example, FIG. 14 shows the path column 164 for the path table used to get the paths to the LUNs serviced by SPA, and FIG. 15 shows the path column 165 for the path table used to get the paths to the LUNs serviced by SPB.

It should be understood that the file server could have some additional load-balancing programs. For example, the program stack (56 in FIG. 2) could include a routine for unmounting a specified file system. When a specified file system is unmounted, if the load balancing method for the volume underlying the file system is "set at mount time" (as indicated by the load balancing method attribute 73 in FIG. 4), then the current LUN-to-path mapping (in the table 116 in FIG. 8) would be accessed in order to decrement the usage count (in the path table 115 in FIG. 8) for each path associated with file system being unmounted, and then the LUN-to-path mapping (in the table 116 in FIG. 8) for the file system being unmounted would be removed from the LUN access path database (67 in FIG. 8).

The program stack (56 in FIG. 2) could include a routine that could be invoked at any time upon a specified mounted file system in order to re-balance the loading upon the paths by re-setting the paths associated with the specified file system in the LUN-to-path mapping table (116 in FIG. 8). This routine would decrement the usage count (in the path table 115 in FIG. 8) for each path currently associated with the specified mounted file system (as indicated by the LUN-to-path mapping in the table 116), and then invoke the LUN access path selector facility (66) to re-set the paths associated with the specified mounted file system in the LUN-to-path mapping table. This routine, for example, could be invoked by a system administrator or by a performance monitoring facility of the file server upon noticing that the specified mounted file system has relatively poor access performance statistics in comparison to other mounted file systems. In a similar fashion, the performance monitoring facility could invoke this routine when changing the load balancing method for a specified file system based on performance statistics.

The program stack (56 in FIG. 2) could also include a routine that could be invoked at any time upon a specified mounted file system in order to choose an alternative set of paths to be used by the file server when accessing the specified mounted file system in response to a read or write request from a specified network client. In this case, the LUN-to-path mapping table (116 in FIG. 8) could include an additional field for a pointer to a list of network client identifiers for network clients that would each have a respective alternative set of paths to be used by the file server when accessing the specified mounted file system in response to a read or write request from the network client. This routine would invoke the LUN access path selector facility 66 to obtain the alternative set of paths to be used by the file server when accessing the specified mounted file system in response to a read or write request from a specified network client, and the alternative set of paths would be stored in the LUN access path database (67 in FIG. 8) in an additional table for the specified mounted file system. This routine could be invoked, for example, by a network client that would impose a relatively high load upon the storage array relative to other network clients accessing the specified mounted file system.

In view of the above, there have been described methods of static load balancing. A data processing system includes a file server and a storage controller linking the file server to a storage array. There are alternative data paths between the file server and the storage controller for accessing logical units of storage in the storage array. A file system is striped across a sequence of a certain number of the logical units of storage. For load balancing, the file server is programmed with a facility for selecting mappings between the certain number of logical units of storage and the data paths between the file server and the storage controller. Upon mounting the file system, the facility is invoked to get a next mapping between the certain number of logical units of storage and the data paths, and this next mapping is used during read and write access to the mounted file system. The facility can also be invoked to get another mapping when another file system is mounted on the LUNs.

What is claimed is:

1. A computer-implemented method of load balancing over data paths between a file server and a storage controller of a storage system, the storage system including a storage array storing logical units of storage, the storage controller providing the file server with access to the logical units of the storage in the storage array, and a file system is striped across a sequence of a certain number of the logical units of the storage so that sequential read or write access to a file in the file system sequentially accesses the certain number of logical units of storage for concurrent transfer of read or write data between the file server and the storage controller over more than one of the data paths between the file server and the storage controller, the method comprising a data processor of the file server executing computer instructions stored on a non-transitory computer-readable storage medium to perform the steps of:

(a) programming the data processor with a facility for providing mappings between the certain number of logical units of the storage and the data paths between the file server and the storage controller for read or write access to the certain number of logical units of the storage;

(b) upon mounting the file system to enable read-write access to the file system, invoking the facility to obtain a next mapping between the certain number of logical units of the storage and the data paths between the file server and the storage controller for read or write access to the certain number of logical units of the storage, and then (c) upon read or write access of the file server to the data storage of a file in the mounted file system, using the next one of the mappings between the certain number of logical units of the storage and the data paths between the file server and the storage controller to select and use one of the data paths for conveying data read from or written to the file in the mounted file system.

2. The computer-implemented method as claimed in claim 1, which includes mounting another file system striped across the sequence of the certain number of logical units of storage, and invoking the facility again upon mounting said another file system to obtain another mapping between the certain number of logical units of the storage and the data paths between the file server and the storage controller to select and use another one of the data paths for conveying data read from or written to a file in said another file system.

3. The computer-implemented method as claimed in claim 1, wherein the next one of the mappings between the certain number of logical units of the storage and the data paths between the file server and the storage controller is obtained in step (b) by scanning a list of alternative data paths between the file server and the storage controller for accessing the certain number of logical units of the storage.

4. The computer-implemented method as claimed in claim 3, which includes storing respective usage counts in association with the alternative data paths and accessing the respective usage counts when scanning the list of alternative data paths so that the next one the mappings obtained in step (b) has a minimum usage count, wherein each of the respective usage counts is a count of a number of mounted file s stems that have obtained and are using a mapping that includes an associated one of the alternative data paths.

5. The computer-implemented method as claimed in claim 3, which includes saving a scanning index used in the scanning of the list of alternative data paths in step (b) and using the scanning index to begin another scan of the list of alternative data paths to obtain another mapping between the certain number of logical units of the storage and the data paths between the file server and the storage controller upon a subsequent mounting of the file system.

6. The computer-implemented method as claimed in claim 3, which includes saving a scanning index used in the scanning of the list of alternative data paths in step (b) and using the scanning index to begin another scan of the list of alternative data paths to obtain another mapping between the certain number of logical units of the storage and the data paths between the file server and the storage controller upon a subsequent mounting of another file system striped across the sequence of the certain number of the logical units of the storage.

7. The computer-implemented method as claimed in claim 1, which further includes obtaining a selection of a load balancing method from a systems administrator for another file system during a configuration process, the selection of a load balancing method indicating that a mapping of the certain number of logical units of storage to the data paths between the file server and the storage controller should be configured before the mounting of any file systems upon the certain number of logical units of storage, and when responding to a read or write request for access to said another file system, using a mapping of the certain number of logical units of storage to the data paths between the file server and the storage controller configured before the mounting of any file systems upon the certain number of logical units of storage to select and use one of the data paths for conveying data read from or written to said another file system.

8. A data storage system comprising:
a file server;
a storage controller; and
a storage array storing logical units of storage;
the storage controller linking the file server to the storage array for providing the file server with access to the logical units of the storage in the storage array, and a file system is striped across a sequence of a certain number of the logical units of the storage so that sequential read or write access to a file in the file system sequentially accesses the certain number of logical units of storage for concurrent transfer of read or write data between the file server and the storage controller over more than one of the data paths between the file server and the storage controller,
the file server including a data processor, and a non-transitory computer-readable storage medium storing computer instructions that when executed perform load balancing by the steps of:

(a) programming the data processor with a facility for providing mappings between the certain number of logical units of the storage and the data paths between the file server and the storage controller for read or write access to the certain number of logical units of the storage;

(b) upon mounting the file system to enable read-write access to the file system, invoking the facility to obtain a next mapping between the certain number of logical units of the storage and the data paths between the file server and the storage controller for read or write access to the certain number of logical units of the storage, and then (c) upon read or write access of the file server to the data storage of a file in the mounted file system, using the next one of the mappings between the certain number of logical units of the storage and the data paths between the file server and the storage controller to select and use one of the data paths for conveying data read from or written to the file in the mounted file system.

9. The data storage system as claimed in claim 8, wherein the computer instructions when executed by the data processor of the file server further perform the steps of mounting another file system striped across the sequence of the certain number of logical units of storage, and invoking the facility again upon mounting said another file system to obtain another mapping between the certain number of logical units of the storage and the data paths between the file server and the storage controller to select and use another one of the data paths for conveying data read from or written to a file in said another file system.

10. The data storage system as claimed in claim 8, wherein the next one of the mappings between the certain number of logical units of the storage and the data paths between the file server and the storage controller is obtained in step (b) by scanning a list of alternative data paths between the file server and the storage controller for accessing the certain number of logical units of the storage.

11. The data storage system as claimed in claim 10, wherein the computer instructions when executed by the data processor of the file server further perform the steps of storing respective usage counts in association with the alternative data paths and accessing the respective usage counts when scanning the list of alternative data paths so that the next one the mappings obtained in step (b) has a minimum usage count, wherein each of the respective usage counts is a count of a number of mounted file s stems that have obtained and are using a mapping that includes an associated one of the alternative data paths.

12. The data storage system as claimed in claim 10, wherein the computer instructions when executed by the data processor of the file server further perform the steps of saving a scanning index used in the scanning of the list of alternative data paths in step (b) and using the scanning index to begin another scan of the list of alternative data paths to obtain another mapping between the certain number of logical units of the storage and the data paths between the file server and the storage controller upon a subsequent mounting of the file system.

13. The data storage system as claimed in claim 10, wherein the computer instructions when executed by the data processor of the file server further perform the steps of saving a scanning index used in the scanning of the list of alternative data paths in step (b) and using the scanning index to begin another scan of the list of alternative data paths to obtain another mapping between the certain number of logical units of the storage and the data paths between the file server and the storage controller upon a subsequent mounting of another file system striped across the sequence of the certain number of the logical units of the storage.

14. The data storage system as claimed in claim 8, wherein the computer instructions when executed by the data processor of the file server further perform the steps of obtaining a selection of a load balancing method from a systems administrator for another file system during a configuration process, the selection of a load balancing method indicating that a mapping of the certain number of number of logical units of storage to the data paths between the file server and the storage controller should be configured before the mounting of any file systems upon the certain number of logical units of storage, and when responding to a read or write request for access to said another file system, using a mapping of the certain number of logical units of storage to the data paths between the file server and the storage controller configured before the mounting of any file systems upon the certain number of logical units of storage to select and use one of the data paths for conveying data read from or written to said another file system.

15. A non-transitory computer-readable storage medium storing computer instructions for load balancing over data paths between a file server and a storage controller providing the file server with access to logical units of the storage in the storage array, and a file system is striped across a sequence of a certain number of the logical units of the storage so that sequential read or write access to a file in the file system sequentially accesses the certain number of logical units of storage for concurrent transfer of read or write data between the file server and the storage controller over more than one of the data paths between the file server and the storage controller, wherein the computer instructions when executed by a data processor of the file server perform the steps of:
 (a) programming the data processor with a facility for selecting mappings between the certain number of logical units of the storage and the data paths between the file server and the storage controller for read or write access to the certain number of logical units of the storage;
 (b) upon mounting the file system to enable read-write access to the file system, invoking the facility to obtain a next mapping between the certain number of logical units of the storage and the data paths between the file server and the storage controller for read or write access to the certain number of logical units of the storage, and then
 (c) upon read or write access of the file server to the data storage of a file in the mounted file system, using the next one of the mappings between the certain number of logical units of the storage and the data paths between the file server and the storage controller to select and use one of the data paths for conveying data read from or written to the file in the mounted file system.

16. The non-transitory computer-readable storage medium as claimed in claim 15, wherein the computer instructions when executed by the data processor of the file server further perform the steps of mounting another file system striped across the sequence of the certain number of logical units of storage, and invoking the facility again upon mounting said another file system to obtain another mapping between the certain number of logical units of the storage and the data paths between the file server and the storage controller to select and use another one of the data paths for conveying data read from or written to a file in said another file system.

17. The non-transitory computer-readable storage medium as claimed in claim 15, wherein the next one of the mappings between the certain number of logical units of the storage and the data paths between the file server and the storage controller is obtained in step (b) by scanning a list of alternative data paths between the file server and the storage controller for accessing the certain number of logical units of the storage.

18. The non-transitory computer-readable storage medium as claimed in claim 17, wherein the computer instructions when executed by the data processor of the file server further perform the steps of storing respective usage counts in association with the alternative data paths and accessing the respective usage counts when scanning the list of alternative data paths so that the next one the mappings obtained in step (b) has a minimum usage count.

19. The non-transitory computer-readable storage medium as claimed in claim 17, wherein the computer instructions when executed by the data processor of the file server further perform the steps of saving a scanning index used in the scanning of the list of alternative data paths in step (b) and using the scanning index to begin another scan of the list of alternative data paths to obtain another mapping between the certain number of logical units of the storage and the data paths between the file server and the storage controller upon a subsequent mounting of the file system.

20. The non-transitory computer-readable storage medium as claimed in claim 17, wherein the computer instructions when executed by the data processor of the file server further perform the steps of saving a scanning index used in the scanning of the list of alternative data paths in step (b) and using the scanning index to begin another scan of the list of alternative data paths to obtain another mapping between the certain number of logical units of the storage and the data paths between the file server and the storage controller upon a subsequent mounting of another file system striped across the sequence of the certain number of the logical units of the storage.

21. A computer-implemented method of static load balancing over data paths between a file server and a storage controller of a storage system, the storage system including a storage array storing logical units of storage, the storage controller providing the file server with access to the logical units of the storage in the storage array, and a file system is striped across a sequence of a certain number of the logical units of the storage so that sequential read or write access to a file in the file system sequentially accesses the certain number of logical units of storage for concurrent transfer of read or write data between the file server and the storage controller over more than one of the data paths between the file server and the storage controller, the method comprising a data processor of the file server executing computer instructions stored on a non-transitory computer-readable storage medium to perform the steps of:
  (a) programming the data processor with a facility for providing mappings between the certain number of logical units of the storage and the data paths between the file server and the storage controller for read or write access to the certain number of logical units of the storage;
  (b) upon mounting the file system to enable read-write access to the file system, invoking the facility to obtain a next mapping between the certain number of logical units of the storage and the data paths between the file server and the storage controller for read or write access to the certain number of logical units of the storage, and then
  (c) upon read or write access of the file server to the data storage of a file in the mounted file system, using the next one of the mappings between the certain number of logical units of the storage and the data paths between the file server and the storage controller to select and use one of the data paths for conveying data read from or written to the file in the mounted file system, and until a time when the mounted file system is unmounted, all read or write access to the mounted file system uses the next one of the mappings between the certain number of logical units of the storage and the data paths between the file server and the storage controller to select and use one of the data paths for conveying data read from or written to files in the mounted file system.

22. The computer-implemented method as claimed in claim 21, wherein the next one of the mappings between the certain number of logical units of the storage and the data paths between the file server and the storage controller is obtained in step (b) by scanning a list of alternative data paths between the file server and the storage controller for accessing the certain number of logical units of the storage, and which includes storing respective usage counts in association with the alternative data paths and accessing the respective usage counts when scanning the list of alternative data paths so that the next one the mappings obtained in step (b) has a minimum usage count, wherein each of the respective usage counts is a count of a number of mounted file systems that have obtained and are using a mapping that includes an associated one of the alternative data paths.

23. The computer-implemented method as claimed in claim 22, which includes saving a scanning index used in the scanning of the list of alternative data paths in step (b) and using the scanning index to begin another scan of the list of alternative data paths to obtain another mapping between the certain number of logical units of the storage and the data paths between the file server and the storage controller upon a subsequent mounting of another file system striped across the sequence of the certain number of the logical units of the storage.

* * * * *